Patented Oct. 7, 1924.

1,510,829

UNITED STATES PATENT OFFICE.

HUGH S. COOPER, OF CLEVELAND, OHIO, ASSIGNOR TO KEMET LABORATORIES COMPANY, INC., A CORPORATION OF NEW YORK.

ENAMEL COMPOSITION.

No Drawing.　　　Application filed January 11, 1921.　Serial No. 436,594.

*To all whom it may concern:*

Be it known that I, HUGH S. COOPER, a citizen of the United States, residing at Cleveland, in the county of Cuyahoga and State of Ohio, have invented certain new and useful Improvements in Enamel Compositions, of which the following is a specification.

This invention relates to enamel compositions for producing vitreous enamels on metals, and particularly to clouding or opaquing ingredients for such compositions.

Tin oxide has heretofore been the most important opaquing agent for high grade enamels. I have now discovered that cerium oxide and certain natural mixtures containing cerium and other rare-earth elements, when used alone or with known opacifying agents, give excellent results, since they require less care in their introduction into the enamel and in many instances give a better color and a higher gloss.

A very important source of cerium is monazite sand, which contains cerium compounds in mixture with compounds of thorium and other rare-earth elements. Large quantities of monazite sand are worked up for thorium in connection with the incandescent gas-mantle industry, and since only the thorium and a small quantity of cerium are desired for mantle making, large amounts of a residue containing cerium and the other rare-earth elements originally present are produced. This residue may advantageously be used as an opacifying agent without the separation of the cerium therefrom.

A product containing all the rare-earths of monazite sand, including thoria, may also be used with excellent results. Such a product may be obtained, for example, in the following manner. Monazite sand is heated with concentrated sulfuric acid until the excess acid is expelled. The residue is washed free from soluble substances and then dried. Upon igniting the mixture of sulfates thus produced, a mixture of the corresponding oxides is obtained.

Cerium oxide may be used alone or in the above described mixtures, or in conjunction with known opacifiers such as tin oxide, sodium metantimonate and zirconium oxide, as stated above. A mixture of equal parts of tin oxide, zirconium oxide and cerium oxide, with or without other rare-earths, gives good results, but I am not limited to any particular proportions. When an expensive opacifier like tin oxide is replaced by cerium oxide or its mixtures, the cost of the enamel is decreased. The material can be used with high silica frits where such opacifiers as zirconium oxide give poor results.

Cerium oxide or its mixtures may be added to enamels during milling, as in the case of tin oxide. When produced by some methods, the cerium opacifiers contain enough iron to give a slight cream color to the finished enamel. This color can be compensated by adding a few thousandths of a per cent of cobalt oxide to the enamel.

It will be understood that a color approaching pure white as nearly as possible is desired in the finished enamel.

I claim:

1. An enamel composition adapted to produce a substantially white opaque coating on metals, said composition containing a cerium compound and a compound of another rare-earth element occurring in monazite sand as opacifying ingredients.

2. An enamel composition adapted to produce a substantially white opaque coating on metals, said composition containing a cerium compound and a compound of another rare-earth element naturally associated with cerium.

3. An enamel composition adapted to produce a substantially white opaque coating on metals, said composition containing a cerium compound and a compound of another rare-earth element occurring in monazite sand.

4. An enamel composition adapted to produce a substantially white opaque coating on metals, said composition containing a cerium compound and a compound of another rare-earth element present in the residues obtained by working monazite sand for thorium.

5. An enamel composition containing a cerium compound and zirconium oxide as opacifying ingredients.

6. An enamel composition containing a cerium compound, zirconium oxide and tin oxide as opacifying ingredients.

In testimony whereof, I affix my signature.

HUGH S. COOPER.